United States Patent [19]

Lynch et al.

[11] Patent Number: 5,799,190
[45] Date of Patent: Aug. 25, 1998

[54] COMMUNICATIONS COPROCESSOR FOR REALIZING BIDIRECTIONAL ISOCHRONOUS COMMUNICATIONS LINK WITH HOST COMPUTER

[75] Inventors: John Lynch, Monte Sereno; James B. Nichols, Los Altos; Mark Devon, San Jose; Jeff Soesbe, San Bruno, all of Calif.

[73] Assignee: Apple Computer, Inc., Cupertino, Calif.

[21] Appl. No.: 288,144

[22] Filed: Aug. 9, 1994

[51] Int. Cl.$^6$ ..................................................... G06F 13/00
[52] U.S. Cl. ..................................................... 395/680
[58] Field of Search ................... 395/200.01, 200.02, 395/200.03, 680, 280, 285, 286; 370/94.1, 60.1, 110.1, 85.1; 379/29, 34, 91, 96

[56] References Cited

U.S. PATENT DOCUMENTS

| | | | |
|---|---|---|---|
| 4,590,551 | 5/1986 | Mathews | 395/477 |
| 4,776,005 | 10/1988 | Petriccione et al. | 379/142 |
| 4,789,981 | 12/1988 | Yanosy, Jr. et al. | 370/359 |
| 4,924,493 | 5/1990 | Dang et al. | 379/93.17 |
| 4,975,896 | 12/1990 | D'Agosto, III et al. | 379/75 |
| 5,008,930 | 4/1991 | Gawrys et al. | 379/210 |
| 5,134,648 | 7/1992 | Hochfield et al. | 379/399 |
| 5,179,586 | 1/1993 | Lee | 379/93.05 |
| 5,233,642 | 8/1993 | Renton | 379/111 |
| 5,305,312 | 4/1994 | Fornek et al. | 370/264 |
| 5,313,454 | 5/1994 | Bustini et al. | 370/231 |
| 5,313,467 | 5/1994 | Varghese et al. | 370/468 |
| 5,345,495 | 9/1994 | Black et al. | 379/29 |
| 5,388,231 | 2/1995 | Starr | 395/285 |
| 5,414,712 | 5/1995 | Kaplan et al. | 371/20.1 |
| 5,425,084 | 6/1995 | Brinskele | 379/112 |
| 5,450,412 | 9/1995 | Takebayashi et al. | 370/463 |
| 5,453,986 | 9/1995 | Davis et al. | 370/259 |
| 5,483,352 | 1/1996 | Fukuyama et al. | 358/402 |
| 5,499,108 | 3/1996 | Cotte et al. | 358/400 |
| 5,499,344 | 3/1996 | Elnashar et al. | 395/308 |

FOREIGN PATENT DOCUMENTS

| | | |
|---|---|---|
| 0 228 794 | 7/1987 | European Pat. Off. . |
| 0 433 077 | 6/1991 | European Pat. Off. . |
| 0 588 703 | 3/1994 | France . |

OTHER PUBLICATIONS

"Computer Dictionary", by Microsoft Press, 1993, p. 279.

*Primary Examiner*—Moustafa M. Meky
*Attorney, Agent, or Firm*—Burns, Doane, Swecker & Mathis, L.L.P.

[57] ABSTRACT

An intelligent communications coprocessor connects computer workstations to moderate-bandwidth (up to 2 megabits/second) digital communications services. In particular, such communications services include but are not limited to Integrated Services Digital Network (ISDN) or Private-Branch Exchange (PBX) communications facilities. The communications coprocessor takes advantage of certain host resources including, preferably, signal processing capabilities of the computer, the computer's power supply and a generalized, high-speed computer/ peripheral serial interface. System cost for digital communications over such communications facilities is therefore reduced. Furthermore, the communications coprocessor can be used to support the transmission of arbitrary real-time, synchronous data streams as encountered in voice and video transmission services. This capability is required for many applications including voice recognition, text-to-speech, and videoconferencing. The communications coprocessor is tightly coupled to the host computer so as to allow real-time digital signal processing of the real-time data stream conveyed by the coprocessor. Finally, the invention can be dynamically reconfigured using an associated host-coprocessor protocol, allowing software upgrades and adaptation to special communications requirements.

7 Claims, 6 Drawing Sheets

FIG_1

BASIC DMA PACKET FORMAT

FIG_3

MULTIPACKET FRAME

FIG_4

FIG_2A

FIG_2B

FIG_5

FIG_6

ISDN TELECOM ADAPTOR INITIALIZATION

FIG_7

TRANSMIT HANDSHAKE TIMING

FIG_8

CONTROL OF BLOCK TRANSFER USING Tx HANDSHAKE

COMMUNICATIONS COPROCESSOR FOR REALIZING BIDIRECTIONAL ISOCHRONOUS COMMUNICATIONS LINK WITH HOST COMPUTER

BACKGROUND OF THE INVENTION

1. Field of the Invention

The present invention relates to data telecommunications and more particularly to data telecommunications over moderate-bandwidth digital communications networks.

2. State of the Art

Personal computers and computer workstations with modems now access a wide variety of networks. Although modem communications is generally adequate for exchanging text files, the transmission of voice, fax and video data, especially simultaneous, requires a data rate that exceeds the capabilities of most modems. The Integrated Services Digital Network (ISDN) is designed to provide what appears to the user to be one unified network satisfying all user needs. ISDN has begun to achieve significant penetration in Europe and, somewhat more slowly, in the U.S. In ISDN networks, a digital adapter serves as the communications equipment. Since the data is digital throughout the network, the function of a modem becomes unnecessary.

Early adoption of ISDN has been hampered by what may be referred to as the "chicken-egg" ISDN dilemma. That is, the limited penetration of ISDN causes potential users to delay adoption of ISDN, resulting in continuing limited penetration, etc. The cost of ISDN technology also remains prohibitive for a broad class of users. The existing installed base of personal computers relies primarily on a standardized, low-bandwidth serial interface to achieve interconnection for telecommunications. For example, the serial port of IBM PCs and compatibles is limited to a data rate of 9.6 kbps. For higher data rates of the type required by ISDN, specialized hardware and software is required.

Furthermore, ISDN is limited to digital data. In the long term, this limitation is likely to be of only passing significance. In the short term (the next five to ten year), however, the exclusively digital nature of ISDN poses a distinct problem. The vast majority of fax machines presently in use are designed to communicate over the analog telephone network. An ISDN user, in order to retain use of such a fax machine, must then have two telecommunications lines, an ISDN line and an analog line. Clearly, the integrated nature of telecommunications envisioned in ISDN will take some time to achieve using ISDN only.

A further obstacle to the integrated nature of telecommunications envisioned in ISDN is the proprietary nature of Private Branch Exchanges (PBXs) used in most large and medium-sized businesses. The PBXs of different vendors each use proprietary signalling and control schemes. As a result, telecommunications devices, including modems and fax machines, cannot be connected directly to a PBX line.

ISDN adapters are available for connecting a computer to the ISDN network. Such adapters typically appear to the host computer as a high-speed modem. In addition, a computer interface has been developed for the IBX communications switch that allows computer access to dialing information, caller ID and so on. Using the computer interface, digital data may be transferred over the PBX at low bandwidths (typically 9600 bps).

These conventional devices do not leverage the resources of the host workstation. That is, they are not able to take advantage of existing resources that may be present on the host computer system. Furthermore, system performance is limited by the low bandwidth of the computer's serial interface. Finally, these devices are only suitable for transmission of digital data over the attached network.

SUMMARY OF THE INVENTION

The present invention, generally speaking, provides an intelligent communications coprocessor that connects computer workstations to moderate-bandwidth (up to 2 megabits/second) digital communications services. In particular, such communications services include but are not limited to Integrated Services Digital Network (ISDN) or Private-Branch Exchange (PBX) communications facilities. The communications coprocessor takes advantage of certain host resources including, preferably, signal processing capabilities of the computer, the computer's power supply and a generalized, high-speed computer/peripheral serial interface. System cost for digital communications over such communications facilities is therefore reduced. Furthermore, the communications coprocessor can be used to support the transmission of arbitrary real-time, synchronous data streams as encountered in voice and video transmission services. This capability is required for many applications including voice recognition, text-to-speech, and videoconferencing. The communications coprocessor is tightly coupled to the host computer so as to allow real-time digital signal processing of the real-time data stream conveyed by the coprocessor. Finally, the invention can be dynamically reconfigured using an associated host-coprocessor protocol, allowing software upgrades and adaptation to special communications requirements.

BRIEF DESCRIPTION OF THE DRAWING

The present invention may be further understood from the following description in conjunction with the appended drawing. In the drawing.

DETAILED DESCRIPTION OF THE PREFERRED EMBODIMENTS

Figure 1:
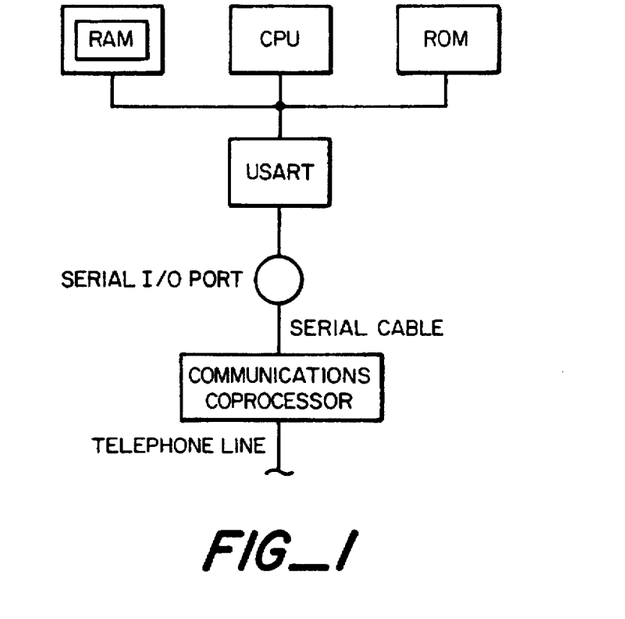
FIG. 1 is a simplified block diagram of a computer system in which the present invention may be used.

The computer system of FIG. 1 is exemplary of a wide variety of computer systems, both large and small, in which serially-connected communications devices may be found and with which the present communications coprocessor may be used. An address bus and a data bus connect a central processing unit (CPU) to read-only memory (ROM), and, through bus transceivers, to randomaccess memory (RAM) and to a UART (universal asynchronous receiver transmitter) or a USART (universal synchronous/ asynchronous receiver transmitter) that provides an interface to a serial I/O port(s). A communications coprocessor is shown connected to the serial port.

Figure 2A:
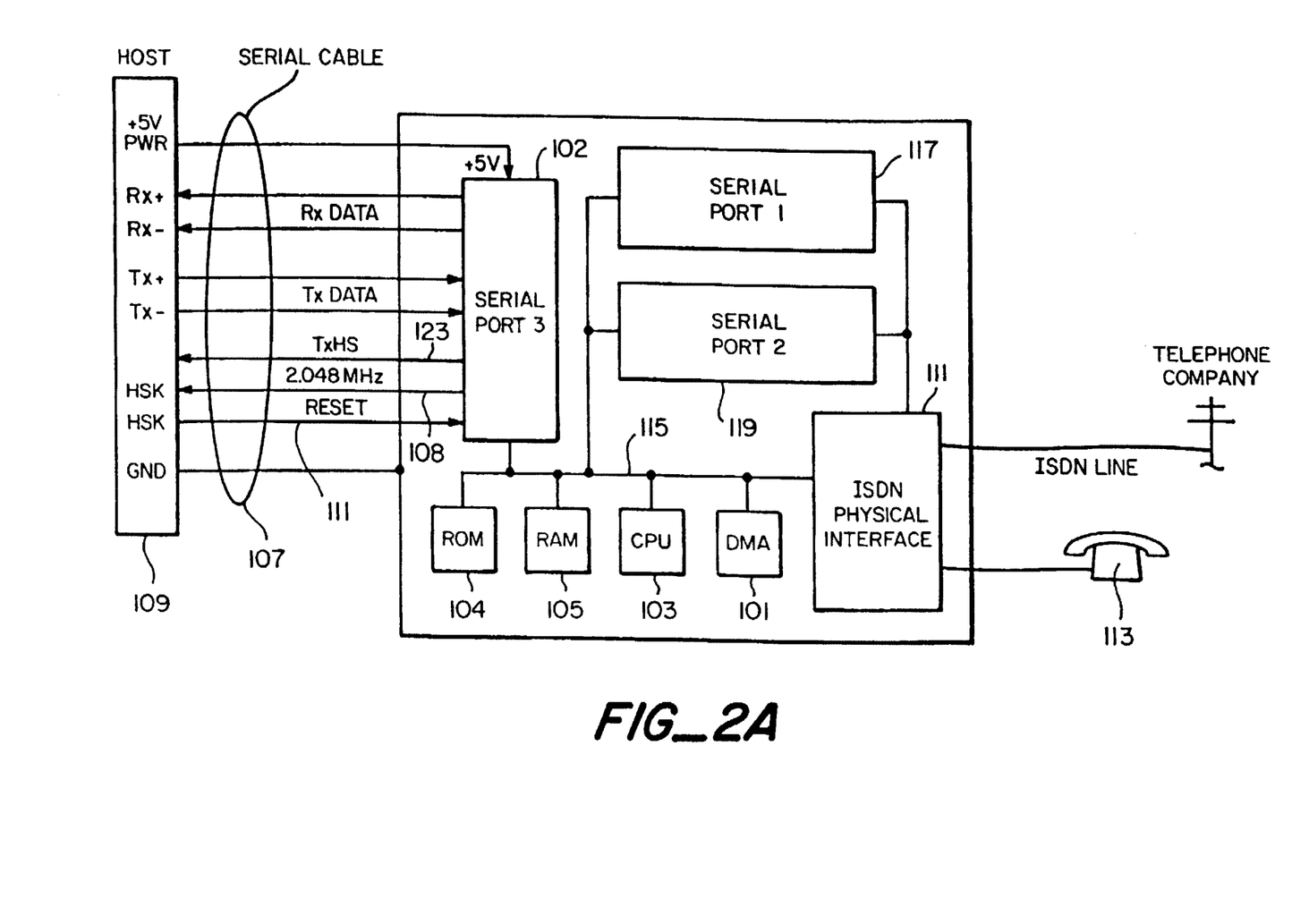
FIG. 2A is a block diagram of a first example of a communications coprocessor in accordance with the present invention.

The present communications coprocessor provides a versatile, general-purpose interface to moderate-bandwidth communications services. Referring to FIG. 2A, showing a first example of a communications coprocessor in accordance with the present invention, the communications coprocessor contains a microprocessor (CPU 103), a random access memory control and program store (RAM, 105), a read-only memory for system initialization and diagnostics (ROM, 104), a direct-memory-access controller (DMA, 101) to exchange the digital data between the communications facilities and the communications coprocessor and between the communications coprocessor and host computer, a serial interface 102 to the host computer system using High-Level Datalink Control (HDLC) signalling; and an interface transceiver (not shown) which couples the coprocessor to the physical transmission medium. In a preferred embodiment, the CPU is realized by a 68302 microcontroller running a real-time multi-talking operating system such as the Apple Real-time Operating System Environment (AROSE).

A serial interface protocol and procedure is defined for attaching the communications coprocessor through a short cable 107 to a standard communications port 109, for example the serial port, of a computer workstation. The computer workstation may (but need not) be equipped with direct memory access (DMA) whereby DMA may be used to service the serial port and off-load the computer's central processing unit (CPU). A protocol and procedure, described more particularly in U.S. application Ser. No. 08/180,926 entitled TELECOMMUNICATIONS INTERFACE FOR UNIFIED HANDLING OF VARIED ANALOG-DERIVED AND DIGITAL DATA STREAMS, now U.S Pat. No. 5,515,373 incorporated herein by reference, allows continuous real-time communications to be maintained between the communications coprocessor and non-DMA capable computers.

Referring still to FIG. 2A, in the case of an ISDN communications coprocessor, the communications coprocessor additionally includes an ISDN physical interface 111 connected to the external ISDN network, to a deskset 113, and to a main bus 115 of the communications coprocessor. First and second serial ports 117 and 119 send and receive user data to and from the ISDN physical interface across the two 64 kbps "B Channels" defined in accordance with ISDN. Data from the serial ports is buffered in the RAM 105 of the communications coprocessor by the DMA controller 101. A telecom sample clock (108) is delivered to and employed by the host for data stream synchronization as explained hereinafter. In a preferred embodiment, the ISDN physical interface is realized by a 79C30 ISDN chip. The serial ports are each realized by the equivalent of an 8530 Serial Communications Controller chip. In the case of Serial Port #3, the Serial Communications Controller chip is modified such that a chip signal (CTS) connected to the Transmit Handshake line 123 is connected internal to the chip so as to affect only receive operation of the chip, not transmit operation.

Figure 3:
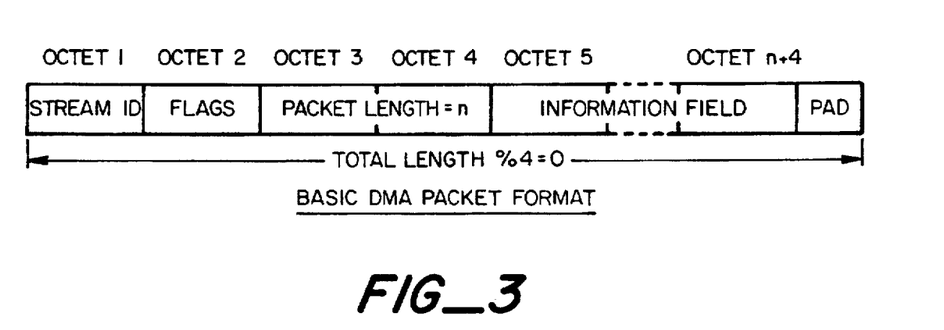
FIG. 3 is a diagram of a basic packet format used by the communications coprocessor.
Figure 4:
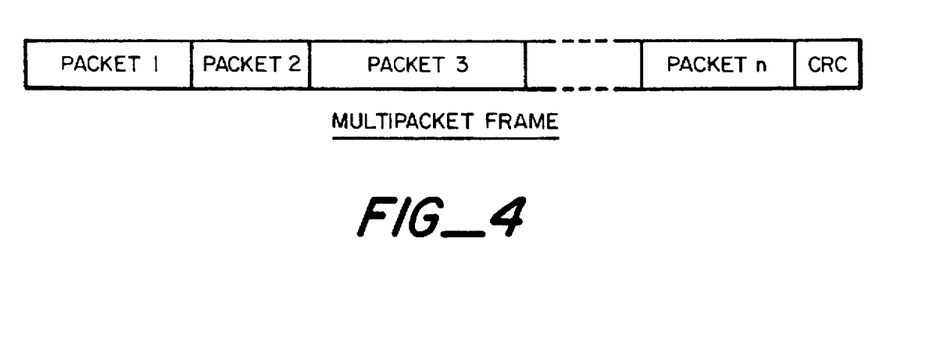
FIG. 4 is a diagram of a multipacket frame used by the communications coprocessor.

Using full-duplex DMA hardware in the computer, a DMA interface may be supported in which data is packetized for transmission using HDLC. A basic DMA packet format is shown in FIG. 3. Multiple logical streams are supported using a stream identifier field appearing at the beginning of the packet. Each stream may be designated (by a higher protocol level) as a control stream, an asynchronous stream, or an isochronous stream as described in greater detail in the aforementioned copending application. Stream flags are used to designate the beginning and ending packets in a block of data which is to be delivered as one unit, to designate command/response data, and for flow control signalling. Multiple packets can be sent in one HDLC frame as shown in FIG. 4.

Referring again to FIG. 2A, a transmit handshake line (123) is provided on the serial interface. When the communications coprocessor wishes to exchange a set of data from a continuous bit rate (CBR) real-time data stream with the computer, it simply transmits any bytes to be transmitted to the computer and then uses the transmit handshake line (123) to force the computer to transmit the appropriate number of bytes to the communications coprocessor. In this way, assuming the computer is equipped with DMA, the constant bit rate stream can be maintained without any intervention by the computer's CPU. Because the communications coprocessor is directly servicing the source of the stream, namely the communications line, the communications coprocessor is better able than the computer to maintain the timing of the constant bit rate stream. Further details concerning the manner in which data is exchange between the computer and the communications coprocessor may be found in copending U.S. application Ser. No. 08/285,542, BYTE-MODE AND BURST-MODE DATA TRANSFER MECHANISM FOR A HIGH-SPEED SERIAL INTERFACE, filed Aug. 2, 1994, still pending, and incorporated herein by reference.

Figure 2B:
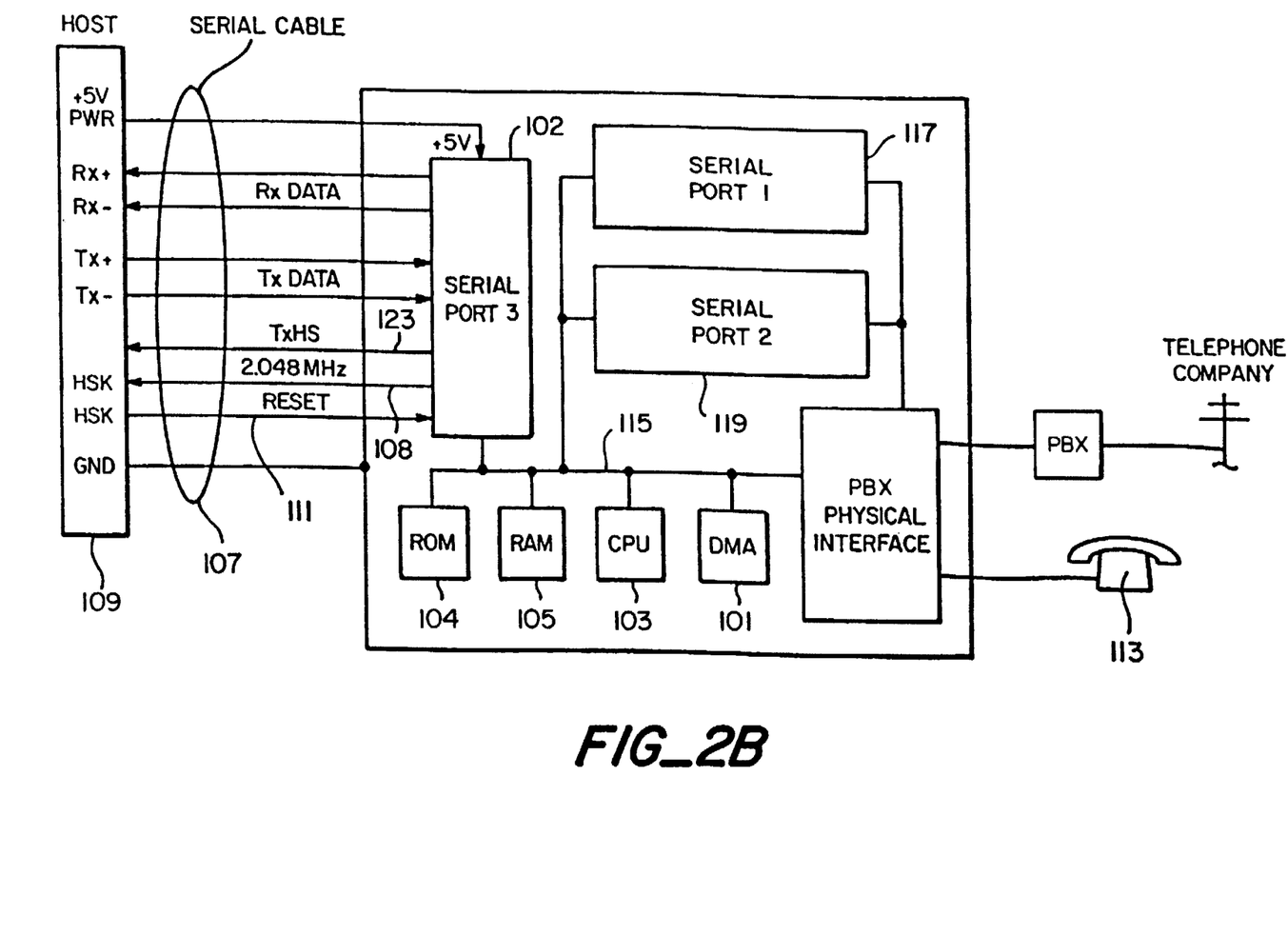
FIG. 2B is a block diagram of a second example of a communications coprocessor in accordance with the present invention.

Referring to FIG. 2B, by substituting the appropriate physical interface circuitry for the ISDN physical interface circuitry 111, the communications coprocessor may be adapted to connect computer workstations to Private-Branch Exchange (PBX) communications facilities, or, more generally, to virtually any telecommunications network. Because the serial interface between the host computer and the communications coprocessor supports multiple independent data streams, arbitrary signalling and control functions may be achieved by designating one or more streams as control streams, as detailed more fully in the aforementioned copending application. This ability allows the communications coprocessor to provide a fully-generalizable hardware/software core that may be used to connect to any of a wide variety of PBXs, some of which employ digital signalling, some of which employ analog signalling, and some of which employ hybrid signalling.

In addition, software for the communications coprocessor is downloadable from the host computer. This ability allows the communications coprocessor to be programmed to handle any of the numerous proprietary PBX formats by downloading the appropriate software routines from the host computer. Equally important, the communications coprocessor provides a debugging facility to aid in code development. A downloader and a debugger are resident in the ROM 104 and are accessed via designated control streams.

Providing for the exchange of digital real-time data streams between various components of the host system and the telephone network enables interworking of the host computer within a larger, possibly global, network of computers. Typical computer subsystems would include, but are not limited to, sound generation, audio recording, video, and so on. In all cases, the host subsystem data stream that exchanges data with the communications coprocessor must be phase-synchronized with the telecom data stream.

Figure 5:
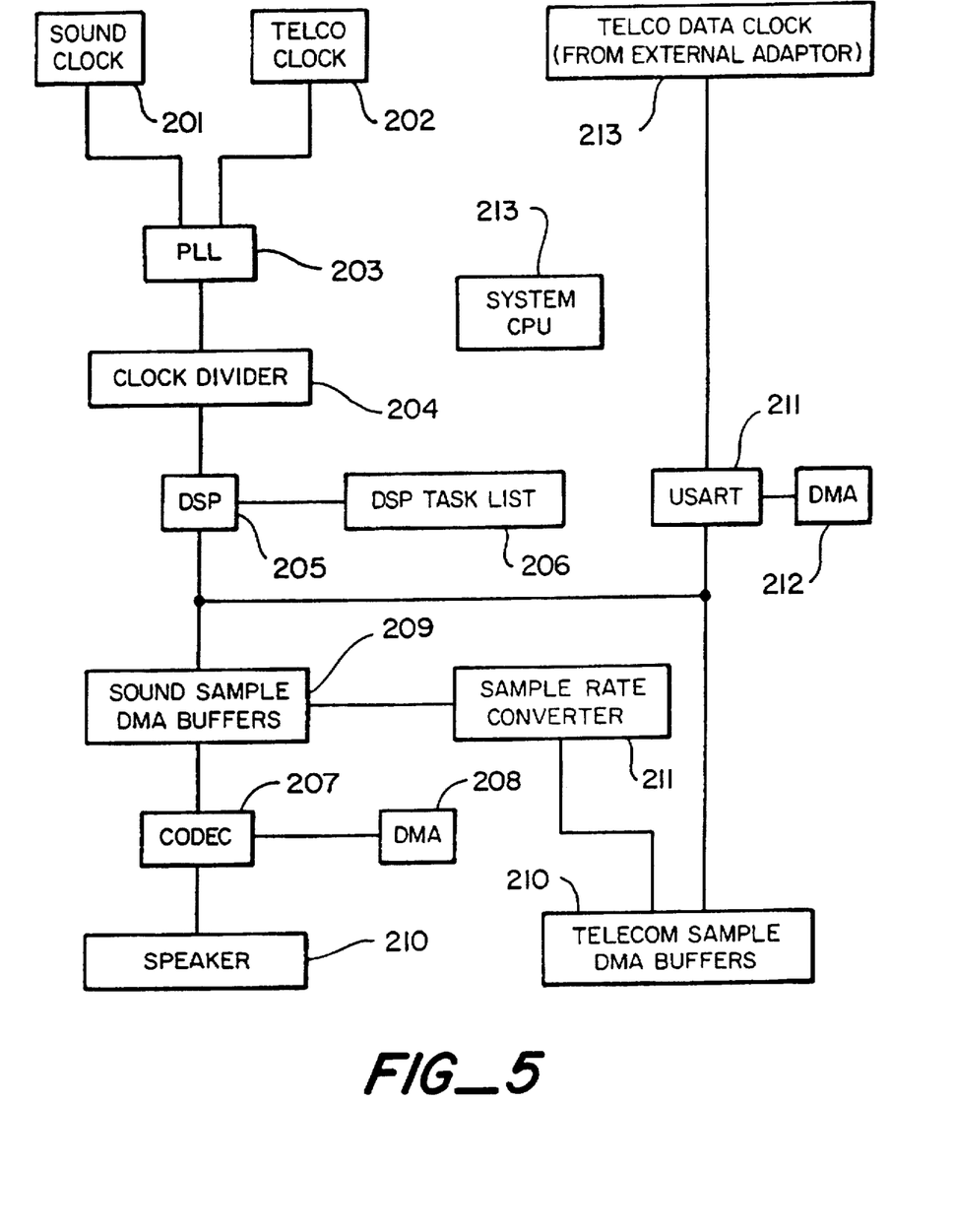
FIG. 5 is a block diagram of a data stream synchronization arrangement.

A procedure for initialization and operation of the communications coprocessor by the host computer, to be described presently in relation to FIG. 5, allows wide-area communications data streams obtained from digital communications networks to be conveniently manipulated and blended into the computer sound facilities, for example. The host computer contains signal processing resources useful for speech generation, voice recognition, sound synthesis, and the like. The procedure ensure that a precise integer relationship is maintained between telecom data and the particular subsystem of interest, such that the host interface subsystem data stream is time-aligned with the communications coprocessor data stream.

Referring to FIG. 5, the host computer system typically employs a CISC (complex instruction set) microprocessor as the central processor (213). However; contemporary CISC processors by their nature lack sufficient processing capacity to treat the digital communications coprocessor data stream in real-time. Therefore, a Digital Signal Processor (DSP 205) is employed to perform the laborious but requisite signal transformation computations on the telecom data stream.

The DSP is a general purpose resource at the disposal of potentially several host computer clients. The host computer operating system software therefore employs a time-based software scheduling algorithm to ensure its clients of reasonable access to the DSP processing resources. The time-based scheduling concept is based on a list of tasks (206) that are defined by the host processor and executed in a sequential manner on the DSP. The time-base atomic unit is called a frame. For this reason the time-based scheduling system is also called a frame-based signal processing system.

Operation of the communications coprocessor is as follows. The bit-synchronous clock (108) and bidirectional data streams are delivered to the host computer on the serial interface (213). The serial data is clocked into a serial-to-parallel converter (211) according to the transitions of the bit-synchronous clock. Since the data stream is real-time, continuous, and must be delivered reliably, regardless of tasks that may be running on the central processor (213), a dedicated Direct Memory Access (DMA) channel (212) is used. The DMA circuit moves data between the Telecom Sample Buffers (210) and the communications coprocessor.

At the same time, the DSP (205) may be executing a parallel time-based task such as sound synthesis over the system speakers. In this case the speaker (210) is driven by a codec (207) from the sound sample buffers (209) which are filled as a result of computations made by the DSP. Again, since the data stream is real-time synchronous, a DMA channel is dedicated to the sound system to ensure reliable transfer of the sound samples to the speaker.

In order to provide the reliable exchange of sample data between the host computer sound system and the communications coprocessor, the sound sample buffer must maintain a fixed phase and time relationship with the telecom sample buffer. Note that, at the same time, the DSP operates according to a time-based scheduling algorithm. Therefore the following procedure is implemented. First, the telecom clock, which was previously shown to be bit-synchronous and in phase with the data stream delivered by the communications coprocessor, is delivered to the host computer USART (211) and a Phase-Locked Loop (203). The telecom data clock is used to synchronize the sound clock (201) which nominally operates at an integer multiple of the telecom data clock. Thus the sound clock is phase-aligned with the telecom data clock.

The output of the PLL is then passed to a clock divider (204) which reduces the clock frequency to yield a periodic pulse. This periodic pulse defines the DSP time frame and is used to awaken the DSP and cause it to execute the task list. The tasks are executed repetitively according to the periodic pulse, which has a nominal period of ten milliseconds. Included in the task list are the sound generation task(s), the telecom sample processing task(s), and a sample rate conversion task. The purpose of the sample rate converter (211) is to transform the N samples found in the telecom sample buffer into M samples loaded into the sound sample buffer by the DSP. However, there must be a strict time alignment between the sound buffer and the telecom sample buffer. Therefore, the communications coprocessor is initialized in precise reference to the output of the clock divider (204).

Figure 7:
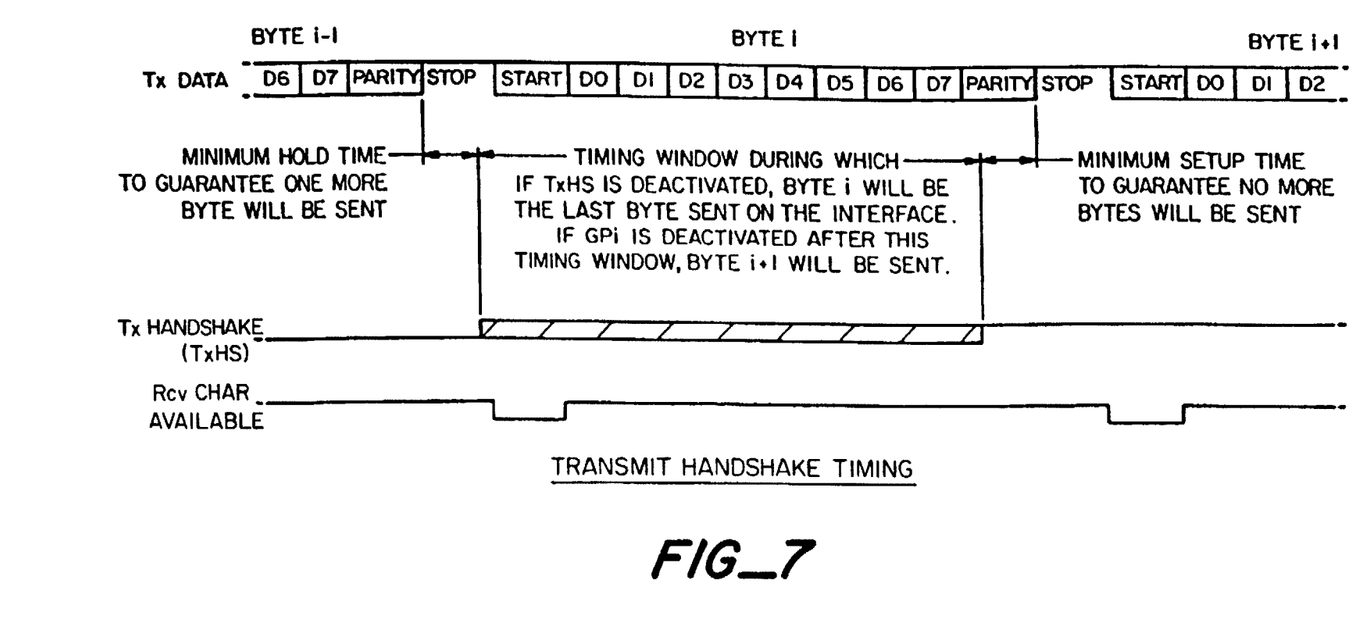
Figure 8:
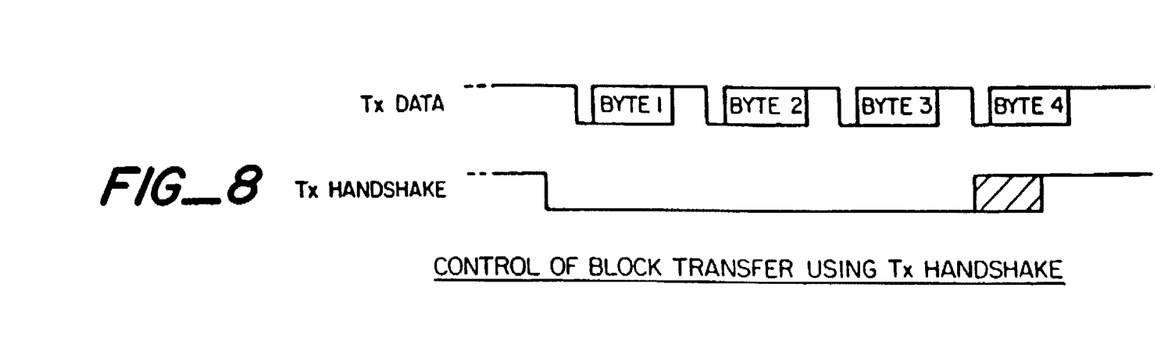

The communications coprocessor has a reset line (111) which is driven by the host computer. The reset line holds the telecom data and clock lines in a quiescent state, when asserted. The clock line is activated, and processing of the data stream commences, when the reset line is de-asserted. A procedure illustrated in FIGS. 6–8 is executed by the System CPU (213) whereby the output of the clock divider is monitored, such that the communications coprocessor reset input is asserted and released at the appropriate time to guarantee time-reference synchronization.

After the initialization sequence is executed, data is delivered from the communications coprocessor to the host computer with both phase and time alignment. Therefore the DSP, which is time scheduled for frame-based processing, is assured that the N telecom samples, which arrive from the communications coprocessor via the system DMA hardware, are entirely coincident with the generation of the M sound samples contained in the sound sample DMA buffer.

Figure 6:
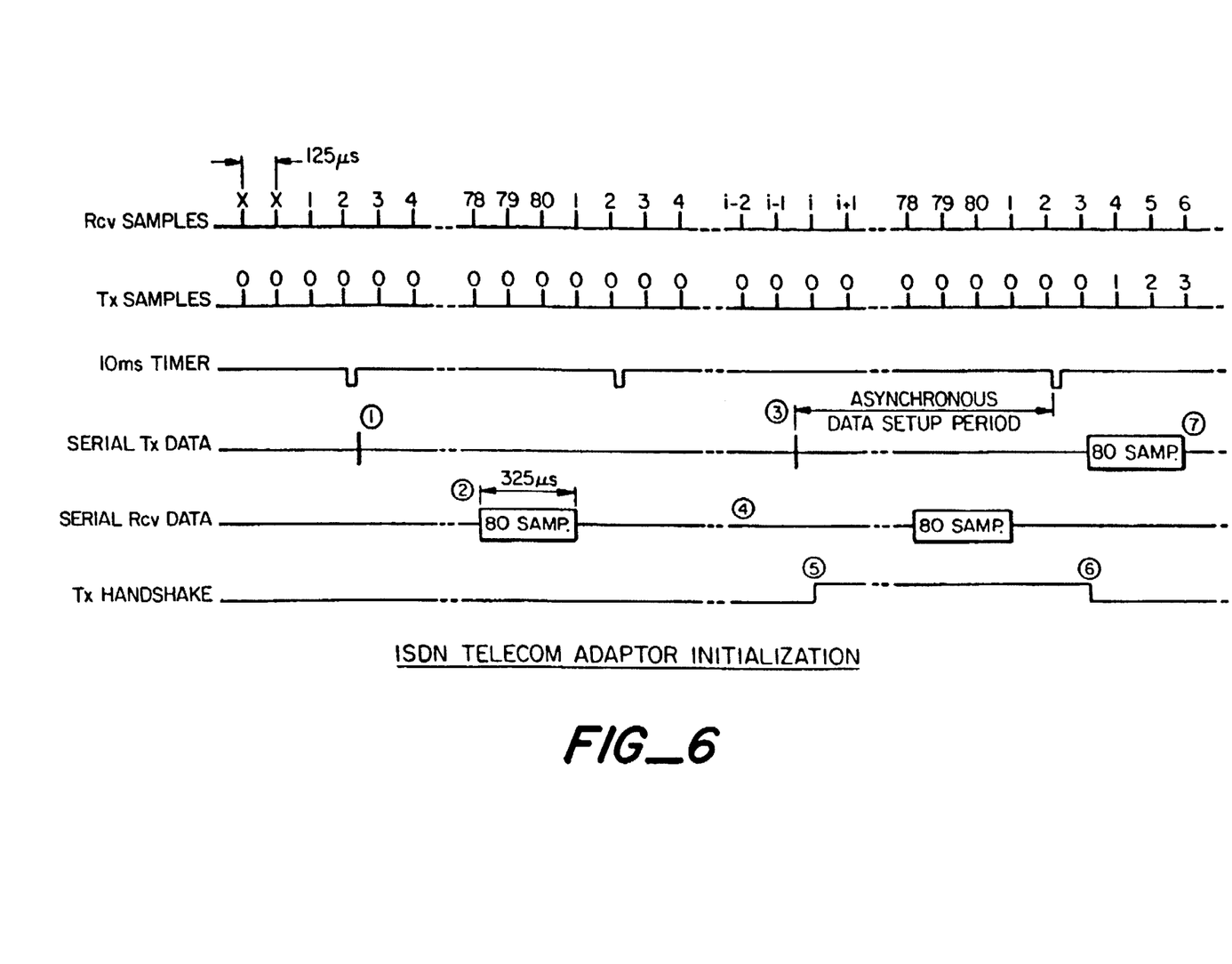
FIG. 6–8 illustrate a procedure used to guarantee time-reference synchronization between the computer system and the communications coprocessor.

More particularly, with reference to FIG. 6, at time 1 the host computer waits for transmission of any asynchronous transmit data in the DMA pipe to be completed; the host computer then waits for the 10 ms timer to expire, whereupon the host computer transmits a sync packet to the communications coprocessor indicating the 10 ms frame boundary. At time 2, the communications coprocessor upon reception of the Frame Sync Packet takes the last two samples as the first two samples of an 80 sample 10 ms frame. The communications coprocessor upon collecting the 78th sample begins the Frame Data Packet. Since it takes approximately 325 μs to send the packet and two more samples take 250 μs, the last two samples will be in the buffer by the time the last two bytes are sent in the packet. This procedure provides at least a one sample period margin, i.e. sample period 2, between the time the last sample is received into the host computer's DMA buffer and the time when the DSP chip grabs the samples in response to the DSP's 10 ms timer firing.

The host computer can transmit asynchronous data up until a safe period, time 3, before it will be required to transmit outbound samples (the host computer must keep track of how much data is in the DMA pipe and the current time). At the time of the final asynchronous data transmission (which could be simply a synchronizing control signal) the host computer will send an end-of-asyncdata signal which indicates to the communications coprocessor that it should disable the Tx Handshake line. The communications coprocessor will not reenable the Tx Handshake line until the beginning of the fourth sample period to guarantee that the DSP chip has been given a full 10 ms to generate transmit samples. During this isochronous data setup period the host computer can begin setting up a new DMA buffer with asynchronous data but not will not enable it until after the transmit samples are sent. The communications coprocessor can send asynchronous data between periods that it sends receive samples, i.e., during the time interval 4, but must insure getting receive samples to the host computer (taking advantage of the one-sample-period leeway) by the time the DSP expects to grab them. Hence the communications coprocessor cannot fill up its DMA pipe so much that it overruns this period.

At time 5, the host computer gets a Tx Handshake change interrupt (SCC CTS interrupt), upon which it will program the DMA to send the data from the transmit sample buffer and enable DMA; data will not be sent until the communications coprocessor reenables Tx Handshake. At time 6, the communications coprocessor will reenable Tx Handshake at the start of the 4th sample period, upon which the transmit samples will be sent to the communications coprocessor. At time 7, the host computer after the transmission of the transmit samples will receive a DMA completion interrupt, upon which it can begin sending asynchronous data until the next isochronous data setup period.

It will be appreciated by those of ordinary skill in the art that the invention can be embodied in other specific forms without departing from the spirit or essential character thereof. The presently disclosed embodiments are therefore considered in all respects to be illustrative and not restrictive. The scope of the invention is indicated by the appended claims rather than the foregoing description, and all changes which come within the meaning and range of equivalents thereof are intended to be embraced therein.

What is claimed is:

1. A communications coprocessor, comprising:

computing means, comprising a microprocessor, a read-only semiconductor memory, and a random-access semiconductor memory, all coupled to a common bus, and including a real-time operating system, for receiving a real-time digital signal and processing the real-time digital signal to produce a series of data samples; and interface means comprising a USART and a clock generator that supplies a data clock to a host computer and realizing a bidirectional isochronous communications link with the host computer, for receiving the digital data samples and inputting the digital data samples to the host computer;

wherein the digital data samples are input to the host computer at a constant bit rate.

2. The communications coprocessor of claim 1, wherein the read-only semiconductor memory includes a software debugger.

3. The communications coprocessor of claim 2, wherein the read-only semiconductor memory includes a software downloader.

4. The communications coprocessor of claim 2, further comprising a direct-memory-access controller coupled to the common bus.

5. The communications coprocessor of claim 2, wherein the interface means comprises means for generating a transmit handshake signal to signal the computer to transmit data to the communications coprocessor.

6. The communications coprocessor of claim 2, further comprising PBX-specific physical interface circuitry, connected to the common bus, for inputting the real-time data signal to the computing means in response to signals from a particular PBX network.

7. The communications coprocessor of claim 1, further comprising ISDN physical interface circuitry, connected to the common bus, for inputting the real-time digital signal to the computing means in response to signals from an ISDN network.

* * * * *